United States Patent [19]

Peelman et al.

[11] Patent Number: 4,579,275

[45] Date of Patent: Apr. 1, 1986

[54] CONTAINERS

[75] Inventors: Paul L. Peelman, Eau Claire; Daniel J. Schneider, Cadott, both of Wis.

[73] Assignee: Standard Oil Company (Indiana), Chicago, Ill.

[21] Appl. No.: 572,743

[22] Filed: Jan. 23, 1984

[51] Int. Cl.⁴ .................. B29C 67/22; B29C 53/20; B29C 51/22; C08J 9/14

[52] U.S. Cl. ...................... 229/1.5 B; 220/902; 264/101; 264/321; 264/338; 425/388; 425/402; 425/436 R; 425/817 R

[58] Field of Search .............. 264/321, 51, 53, 48, 264/45.5, DIG. 14, 101; 229/1.5 B; 220/902; 425/388, 402, 436 R, 817 R

[56] References Cited

U.S. PATENT DOCUMENTS

| | | |
|---|---|---|
| 3,045,286 | 7/1962 | Harrison ................ 264/321 X |
| 3,054,146 | 9/1962 | Griffin .................. 264/321 X |
| 3,164,655 | 1/1965 | Howard et al. ............ 264/321 |
| 3,374,298 | 3/1968 | Studen ................. 264/321 X |
| 3,534,128 | 10/1970 | Makowski ............... 264/51 X |
| 3,544,675 | 12/1970 | Isle .................... 264/321 |
| 3,616,020 | 10/1971 | Whelan ................. 156/309 |
| 3,669,794 | 6/1972 | Mazur .................. 156/244 |
| 3,846,526 | 11/1974 | Wade ................... 264/51 X |
| 3,933,959 | 1/1976 | Skochdopole et al. ...... 264/51 X |
| 4,060,577 | 11/1977 | Collins ................. 264/51 X |
| 4,359,160 | 11/1982 | Myers et al. ............ 264/321 X |

Primary Examiner—Philip Anderson
Attorney, Agent, or Firm—David E. Boone; William T. McClain; William H. Magidson

[57] ABSTRACT

Increasing the wall strength of a cup having a closed cell foam wall and a solid plastic coating on at least the outer surface thereof by contacting said surface of the cup with a heated mandrel. Apparatus is also shown.

9 Claims, 2 Drawing Figures

U.S. Patent   Apr. 1, 1986   4,579,275
FIG. 1
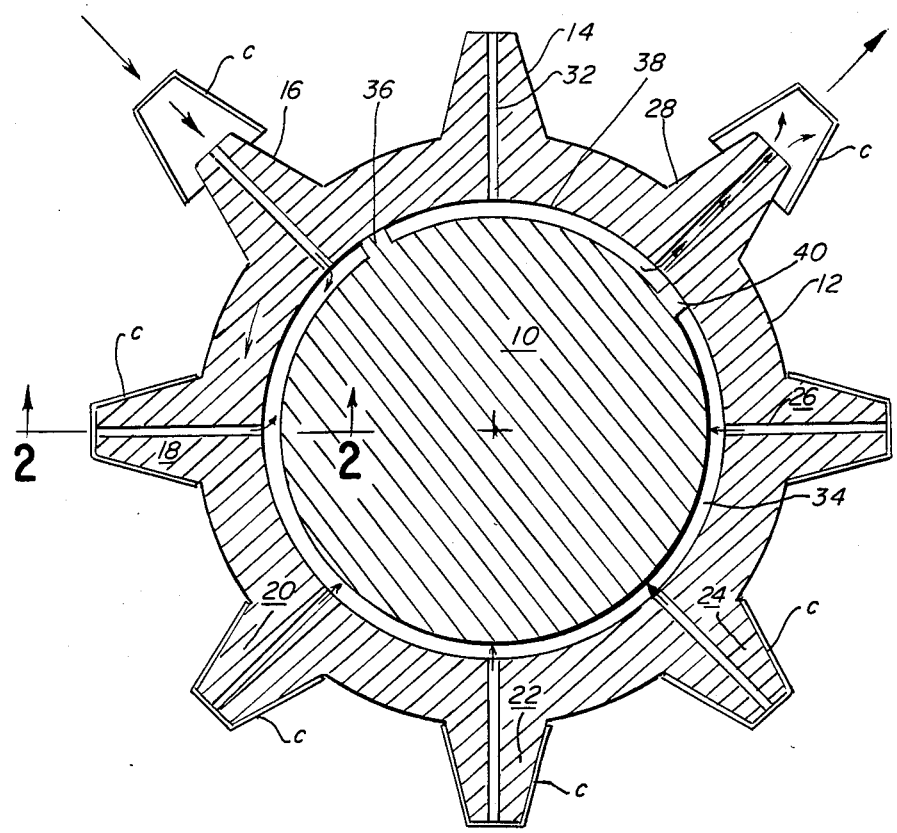
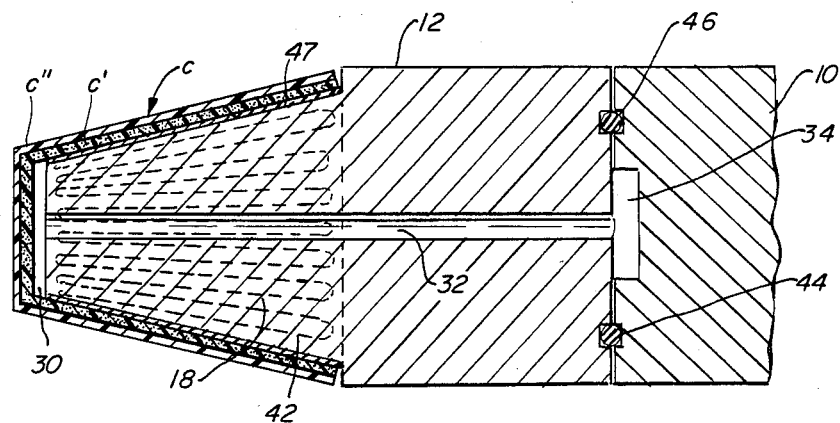
FIG. 2

CONTAINERS

This invention relates to a foam cup which has been treated to improve the strength thereof. The cup is made from a foam resin sheet produced by the blown bubble technique to which a solid resin layer is applied to one or both sides of the foam.

Foam cups are widely used for individual servings of hot beverages, such as coffee and soup, and cold beverages such as soft drinks. Many millions are used every day. Obviously, the cup must have sufficient strength to permit handling by the user, but, at the same time, use a minimum amount of resin for the product. Polystyrene and other resins can be used to produce the cup although the majority are now made from polystyrene.

Broadly, our invention resides in a method of treating a cup, such as that designated C in FIG. 2, having a closed cell foam wall, such as C' in FIG. 2, and a solid plastic film coating, such as C" in FIG. 2, on at least the outer surface thereof, said cup having been formed from roll stock, comprising contacting the inner wall of said cup but not the bottom with a heated mandrel at a temperature and for a time sufficient to expand said wall, said heating increasing the wall strength and removing wrinkles on the inside of the wall of the cup.

Briefly, the cup is held on the mandrel, maintained at a temperature of 180° to 260° F., for a contact time of 5 to 8 seconds. Best results have resulted from a mandrel temperature of 230° F. using a 6 second contact time.

In another aspect, our invention resides in apparatus for treating closed cell foam cups to improve the characteristics of the wall of the cup comprising a rotatable turret, means to drive said turret, a plurality of mandrels mounted on said turret, means to heat said mandrels, means to apply vacuum and gas under pressure to each of said mandrels at preselected positions on said turret, means to feed cups to a mandrel in a first position, and means to convey cups from a mandrel in a second position.

In the preferred apparatus, the mandrels are electrically heated and contain means for temperature control. Any suitable power source can be used.

The cups are fed to the mandrel and contained thereon by vacuum applied to the mandrel and removed by forcing a gas under pressure between the mandrel and the cup. This gas may be heated and preferably is air.

The sidewall prior to heating has a thickness of 0.02 to 0.05 inch and heating provides an increase in thickness of 10 to 50 percent. The cups produced by us in the work reported herein were produced in a G1000 VII machine of Paper Machinery Corporation of Milwaukee, Wis. This company is widely known as a producer of machines for the production of paper cups.

In the production system, the cups of this invention were prepared from single sidewalled rolled stock produced according to the disclosure of Mazur U.S. Pat. No. 3,669,794. Double coated stock can also be used, a production method being shown in Whelan et al. U.S. Pat. No. 3,616,020.

Heating foam cups has been disclosed as a method of improving the strength of containers. One example of this is Shapiro et al. U.S. Pat. No. 3,344,222 (1967). In this patent, foam cups produced by extrusion of foamable sheets of polystyrene are made, no solid layer being present, and the foam cups treated while holding the cup between restraining surfaces. This is said to provide a density gradient with denser foam near the surface of the cup, thus increasing the strength of the cup. According to the patentees, the thickness of the wall or walls of the container does not apparently change. The patentee also states that a wall gradient of two or three times the original thickness will severely impair the formation of the dense surface walls and the heat-insulating interior zones.

Another patent which requires an increase in thickness when a foam cup is heated, is Myers, et al., U.S. Pat. No. 4,359,160 (1982), this patent being directed to a thermoformed cup or container. The sheet for the thermoforming operation is produced by extrusion of molten polystyrene containing a blowing agent and a nucleating agent from a slit-ring orifice. This product, like the product of the invention, contains closed, generally spherical closed cells as extruded. In the process of Myers, et al., this sheet is thermoformed by a plug-system method which stretches the cells and produces a product containing "pancake"-shaped cells. Upon heating this thermoformed cup, as when hot beverage is added thereto, the cells tend to return to spherical shape.

Another system which has been developed is that of Schneider, et al. Ser. No. 540,318, filed Oct. 11, 1983 and now U.S. Pat. No. 4,547,412, wherein cups are heated in the unrestrained condition. This invention differs therefrom in that the wide walls of the cup are restrained during the heating operation.

From the foregoing, it is obvious that the object of this invention is to provide a coated foam cup of improved strength.

Further, an object of this invention is to provide a method for producing the container.

Further, an object of this invention is to provide apparatus for carrying out the method.

Other objects of this invention will become apparent to those skilled in the art upon reading this disclosure.

An additional result obtained through the use of our invention is the improved internal surface characteristics of the cup. When formed on the Paper Machinery Corporation apparatus, wrinkles are produced in the inside surface of the cup. These wrinkles detract from the aesthetics of the cup and these wrinkles are removed in the heat treatment of this invention.

Accompanying and forming part of the disclosure is a drawing comprising:

FIG. 1, a cross-section of the apparatus of this invention for treating cups, and FIG. 2, a cross-section of the turret and mandrel on line 2—2 of FIG. 1.

While various tyes of apparatus can be used in the practice of our invention, one suitable system is shown in this drawing.

10 represents an arm around which rotates turret 12. This turret is provided with a plurality of mandrels 14, 16, 18, 20, 22, 24, 26 and 28. The cups C fit upon each mandrel with contact over substantially all of the side wall leaving a space 30 (see FIG. 2) between the mandrel and the bottom of the cup. Each mandrel is provided with a central bore 32 in FIG. 1 and in the cross-section of FIG. 2. Between arm 10 and the inner surface of turret 12 there is provided an open space 34 which connects with the bore 32 in each mandrel. Stationary blocks 36, 38 and 40 serve to separate the space 34 into 3 distinct chambers. By means not shown, a vacuum is applied to space 34 between barriers 36 and 40 extending for most of the circumference of arm 10. Gas under pressure is provided in the space between barriers 38 and 40. A chute (not shown) guides cups C onto mandrel 16 in a first position and guide means (not shown) are positioned above mandrel 28 to guide cups removed from the turret. More specific details are shown in FIG. 2, this drawing also illustrating a heating coil 42 in the mandrel. The heating coil temperature is controlled in ways known to the art. For instance, one can use a control thermocouple to record actual temperature or by the use of a properly calibrated variable voltage transformer. FIG. 2 also shows the stationary arm 10 and rotating turret 12. To maintain vacuum or pressure in the space 34, Teflon plastic rings 44 and 46 are provided.

In the operation, cups are supplied to mandrel 16 in a first position and held thereon by the vacuum until the turret reaches the position shown for turret 28. At this stage, the gas under pressure blows the cup off of the mandrel. Heated gas can be used if further heat treatment is desired. For reasons of economy, air is the preferred gas.

Turrets with different sized mandrels can be used for the various cups produced, 6 through 16 ounce being the normal range of size.

To improve cup release from the mandrel and to increase the abrasive resistance, the mandrel can be coated with a Teflon/ceramic coating 47. The speed of the treatment and the number of mandrels depend upon the time for the desired time of contact. The range of 4 to 8 seconds is most generally used.

The following examples set forth preferred embodiments of the invention, but the examples should not be considered unduly limiting.

EXAMPLE I

Amoco R2 polystyrene resin was extruded by the blown bubble technique using butane in an amount of 4 wt. percent as a blowing agent and a talc nucleating agent in an amount of 0.5 to 0.75 wt. percent, all weights being based upon the amount of polystyrene. The production system is well-known. After slitting and opening of the sheet to a flat structure, the sheet was fed between nip rollers into which nip was extruded a polystyrene solid resin. The solid resin was a 50–50 mixture of Amoco R2 and Amoco H2R polystyrene, the mixture containing, as a pigment, 2 to 4 wt. percent of $TiO_2$. A good bond was obtained with this system. The foam thickness was slightly less than 0.03 inch and the solid resin thickness was approximately 0.002 inch.

Using a heated mandrel maintained at 230° F., cups were treated thereon for the time shown in the following table.

| Seconds | Thickness Range Inch | Average Increase in Thickness Percent |
| --- | --- | --- |
| 0 | .030–.032 | 0 |
| 3 | .034–.036 | 16 |
| 4 | .035–.037 | 20 |
| 5 | .038–.040 | 30 |
| 6 | .039–.041 | 33 |
| 7 | .040–.042 | 36 |
| 8 | .041–.043 | 40 |

Best results were obtained using treatment time of 6 seconds.

EXAMPLE II

Another series of cups were tested to establish the increased in strength of the sidewalls. The sidewalls deflective strength was tested on a complete cup. Each was placed on a platform to which sidewall pressure was applied 1 inch from below this rim. A gram scale was provided to apply a gradually increased weight to the rim and the deflection measured. The data show the load required for a ½ inch deflection using a 9 ounce cup. The data are shown in the following table.

| Time of Heating (Sec) | Gram deflection | | | | | W % |
| --- | --- | --- | --- | --- | --- | --- |
| | Run 1 | Run 2 | Run 3 | Run 4 | Ave. | |
| 0 | 345 | 350 | 330 | 465 | 348 | |
| 3 | 395 | 435 | 465 | 455 | 438 | 26 |
| 4 | 400 | 475 | 495 | 475 | 461 | 32 |
| 5 | 495 | 490 | 475 | 485 | 486 | 39 |
| 6 | 550 | 475 | 520 | 505 | 513 | 47 |
| 7 | 525 | 530 | 490 | 515 | 515 | 48 |

From the foregoing description, those skilled in that art will appreciate that the modification can be made without departing from the broad scope of the invention. It is not intended to limit the broad scope of the invention to those embodiments illustrated and described, but reasonable modifications can be made.

We claim:

1. A method of treating a cup having a closed cell foam wall and a solid plastic film coating on at least the outer surface thereof, said cup having been formed from roll stocks, comprising contacting the inner wall of said cup but not the bottom with a heated mandrel at a temperature and for a time sufficient to expand said wall, said heating increasing the wall strength and removing wrinkles on the inside of the wall of the cup.

2. The method of claim 1 wherein the outer surface of the mandrel is maintained at a temperature of 180° to 260° F. and said time of contact is 5 to 8 seconds.

3. The method of claim 1 wherein the outer surface of the mandrel is maintained at 230° F. and said time of contact is 6 seconds.

4. The method of claim 1 wherein said cup is held against said mandrel by vacuum and said cup is ejected from said mandrel by gas under pressure.

5. The method of claim 4 wherein the gas under pressure is heated.

6. A cup produced by the method of claim 1.

7. Apparatus for treating closed cell foam cups to improve the characteristics of the wall of the cup comprising a rotatable turret, means to drive said turret, a plurality of mandrels mounted on said turret, means to heat said mandrels, means to apply vacuum and gas under pressure to each of said mandrels at preselected positions on said turret, means to feed cups to a mandrel in a first position, and means to convey cups from a mandrel in a second position.

8. The apparatus of claim 7 wherein said mandrels are electrically heated with the temperature being controlled by a thermocouple connected to a controlled power source.

9. The apparatus of claim 7 including means to heat the gas under pressure supplied to the mandrels.

* * * * *